July 6, 1971  HANS-GEORG TRIESCHMANN ET AL  3,591,446
SURFACES FOR PLAYING FIELDS
Filed June 3, 1969
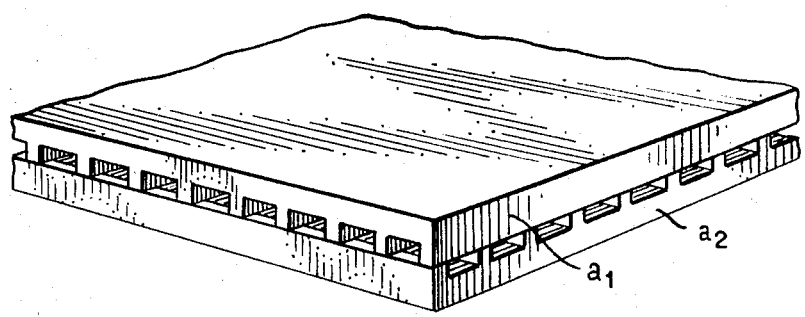
INVENTORS:
HANS-GEORG TRIESCHMANN
LEO UNTERSTENHOEFER
SIEGFRIED MAIER
HEINZ BERBNER
BY
Johnston, Root, O'Keeffe, Keil, Thompson & Shurtleff
ATT'YS United States Patent Office 3,591,446
Patented July 6, 1971

3,591,446
SURFACES FOR PLAYING FIELDS
Hans-Georg Trieschmann, Hambach, Leo Unterstenhoefer, Limburgerhof, Siegfried Maier, Speyer, and Heinz Berbner, Weiher, Germany, assignors to Badische Anilin- & Soda-Fabrik Aktiengesellschaft, Ludwigshafen am Rhine, Germany
Filed June 3, 1969, Ser. No. 829,986
Claims priority, application Germany, June 7, 1968,
P 17 59 787.4
Int. Cl. B32b 3/00
U.S. Cl. 161—122
2 Claims

ABSTRACT OF THE DISCLOSURE

Special surfaces for playing fields comprising an upper layer ($a_1$) and a lower layer ($a_2$), each layer consisting of a thermoplastic molding material having a special composition. The layers ($a_1$) and ($a_2$) are webs or boards provided with parallel ribs on one side only, layer ($a_1$) being arranged on top of layer ($a_2$) in such a way that the ribbed sides are in contact, the ribs of one layer being at an angle of from 45° to 90° to those of the other layer.

---

The present invention relates to surfaces in the form of webs or boards for playing fields.

Conventional surfaces of playing fields generally consist of:

(1) water-bound inorganic material, for example fine red gravel and tufaceous sand (particularly outdoors);
(2) asphalt or cement;
(3) wood (particularly indoors); and
(4) linoleum or polyvinyl chloride (particularly indoors).

It is known that these surfaces have a number of disadvantages. Water-bound inorganic surfaces (1) are for example not weather-resistant, require a great deal of attention and are only slightly resilient. Asphalt and cement surfaces (2) are for example too hard and lack the desired resilience. Wooden surfaces (3) are for example expensive, require considerable attention and are not resilient enough. Linoleum and polyvinyl chloride surfaces (4) are for example practically devoid of elasticity.

More recently, attempts have been made to obviate the said disadvantages by the use of plastics surfaces. These surfaces fall substantially into two groups: (I) compressible, inherently resilient monolithic surfaces, for example those based on polyurethanes; and (II) surfaces in which relatively small particles of compressible substances, such as rubber or cork, are bonded together with a plastics binder, such as vinyl chloride, acrylate or isobutylene polymers.

As is well known, the said plastics surfaces have a number of advantages over conventional surfaces, but they leave much to be desired in some respects, e.g. increasing resiliency is accomplished by a decrease in hardness and consequently an increasing loss of energy, particularly when the surface is loaded for short intermittent periods for example by runners. Another disadvantage is that any damage to the surface can only be repaired with considerable trouble.

The object of the present invention is to provide surfaces which do not have the said disadvantages or only have them to a slight extent.

We have now found that this object can be achieved by giving the surface (a) a special structure and (b) making it from special materials.

Surfaces in accordance with this invention have the following features: (a) they comprise an upper layer ($a_1$) and a lower layer ($a_2$), each layer being a web or board 3 to 10 mm. in thickness which has on one side only parallel ribs having a height of from 1 to 5 mm., a cross-sectional area of from 2 to 25 mm.$^2$ and being spaced apart at a distance of from 5 to 20 mm., layer ($a_1$) being arranged on top of layer ($a_2$) in such a way that the ribbed sides are in contact, the ribs on one layer being at an angle of from 45° to 90° to those of the other layer; and (b) the upper layer ($a_1$) and lower layer ($a_2$) are prepared from a thermoplastic molding material which has a mean elongation of from 400 to 800% and a modulus of elasticity of from 60 to 100 kg./cm.$^2$ and which consists of ($b_1$) 100 parts of weight of bitumen, ($b_2$) from 50 to 120 parts by weight of an ethylene polymer, and, if desired, ($b_3$) up to 100 parts by weight of a filler.

The following details are given concerning the structure (a) of the surface:

As the thickness of the upper layer ($a_1$) increases, there is an increase in hardness and at the same time an increase in the elasticity of the surface (with the same lower layer ($a_2$)). A change in the thickness of the lower layer ($a_2$) has practically no effect on the hardness and elasticity of the surface.

The height and cross-sectional area of the ribs of the upper layer ($a_1$) and lower layer ($a_2$) affect the hardness and elasticity of the surface. As the height increases, the cross-sectional area remaining constant, there is a decrease in hardness and a decrease in elasticity. The cross section may advantageously have the shape of a circle, semicircle, square, ellipse or hemi-ellipse (ratio of axes in the latter two cases up to about 1:4), a rectangle (ratio of sides up to about 1:4) or a swallowtail (ratio of small side to large side up to about 1:6). The respective distances between the ribs on the upper layer ($a_1$) and on the lower layer ($a_2$) affect the hardness and elasticity of the surface, i.e. as the distance increases, the hardness and resilience decrease. In this connection it should be pointed out that the shape of the upper layer ($a_1$) need not be the same as that of the lower layer ($a_2$). It may be advantageous for example for the thickness of the upper layer ($a_1$) to be greater than that of the lower layer ($a_2$).

From the foregoing it can be seen that surfaces according to this invention may easily be given practically any hardness and resilience by appropriate choice of the dimensions of the two layers.

The thermoplastic molding materials (b) for the production of the upper layer ($a_1$) and the lower layer ($a_2$) to be used according to this invention are known. They are described for example in Italian patent specifications Nos. 707,289 and 779,373, in British patent specification No. 1,042,303 and in the published papers of Belgian Pat. No. 694,900. It has been found that molding materials which are very suitable consist or substantially consist of ($b_1$) 100 parts by weight of bitumen having a penetration (according to DIN 1995) of from 10 to 210, ($b_2$) 80 to 100 parts by weight of an ethylene polymer which contains from 3 to 70 parts by weight of polymerized units of n-butyl acrylate per 100 parts by weight of ethylene. In this connection it should be mentioned that the thermoplastic molding material for the upper layer ($a_1$) need not be the same as the molding material for the lower layer ($a_2$). Thus for example it may be advantageous in some cases to use a composition containing a filler for the upper layer ($a_1$) and a composition without filler for the lower layer ($a_2$).

The production of the two layers ($a_1$) and ($a_2$) of the surface may be carried out by methods such as are conventionally use for the thermoplastic molding materials (b) in question. Layers ($a_1$) and ($a_2$) may advantageously be prepared for example by molding the material at atmospheric pressure (at temperatures of from about 200° to 280° C.) in appropriate horizontal molds (for the production of boards) or by extruding the molding material (at operating temperatures of from about 100° to 160° C.) through slot dies (production of webs).

The production of the surfaces from the two layers $(a_1)$ and $(a_2)$ may also be carried out by methods such as are conventionally employed for the thermoplastic molding materials (b) used, particularly by bonding or fusion.

Suitable subgrades for the surfaces according to this invention are hard surfaces which should be as level as possible, e.g. the conventional surfaces given above under (1) and (2), particularly those of materials bound with bitumen or cement.

Application of the surface to the subgrade may be carried out by methods such as are conventionally used for plastics surfaces, for example by simply placing into position or by bonding.

Any damage to the surfaces according to this invention can be repaired on the spot by heating the surface to temperatures of from about 180° to 240° C. (so that the material becomes plastic) and smoothing it down, if necessary with the addition of heated fresh molding material.

The accompanying drawing shows a surface in accordance with this invention having an upper layer $(a_1)$ and a lower layer $(a_2)$. It can be seen from the drawing that the upper layer $(a_1)$ and the lower layer $(a_2)$ each consists of a web or board having parallel ribs on one side, layer $(a_1)$ being arranged on top of layer $(a_2)$ in such a way that the ribbed sides are in contact, the ribs of one layer being at an angle of 90° to those of the other layer.

We claim:

1. A surface for playing fields in the form of webs or boards (a) which is composed of an upper layer $(a_1)$ and a lower layer $(a_2)$, each layer being a web or board 3 to 10 mm. in thickness provided on one side only with parallel ribs having a height of from 1 to 5 mm., a cross-sectional area of from 2 to 25 mm.² and being spaced apart at a distance of from 5 to 20 mm., layer $(a_1)$ being arranged on top of layer $(a_2)$ such that the ribbed sides are in contact, the ribs of one layer being at an angle of from 45° to 90° to those of the other layer; and (b) said upper layer $(a_1)$ and lower layer $(a_2)$ being molded from a thermoplastic molding material having a mean elongation of from 400 to 800% and a modulus of elasticity of from 60 to 100 kg./cm.² and substantially consisting of $(b_1)$ 100 parts by weight of bitumen, $(b_2)$ from 50 to 120 parts by weight of an ethylene polymer.

2. A surface for playing fields as claimed in claim 1 in which the bitumen-ethylene composition includes up to 100 parts by weight of a filler.

References Cited

UNITED STATES PATENTS

| 839,834 | 1/1907 | Gray | 161—122 |
| 2,801,937 | 8/1957 | Hess | 117—140X |

FOREIGN PATENTS

| 531,014 | 11/1957 | Belgium | 161—122 |
| 547,811 | 11/1959 | Belgium | 161—55 |

WILLIAM A. POWELL, Primary Examiner

U.S. Cl. X.R.

161—123, 139